United States Patent
Park et al.

(10) Patent No.: US 9,390,330 B2
(45) Date of Patent: Jul. 12, 2016

(54) APPARATUS AND METHOD FOR EXTRACTING CORRESPONDENCES BETWEEN AERIAL IMAGES

(75) Inventors: Il-Kyu Park, Daejeon (KR); Chang-Woo Chu, Daejeon (KR); Young-Mi Cha, Busan (KR); Bon-Ki Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1122 days.

(21) Appl. No.: 13/325,957

(22) Filed: Dec. 14, 2011

(65) Prior Publication Data

US 2012/0155745 A1    Jun. 21, 2012

(30) Foreign Application Priority Data

Dec. 16, 2010   (KR) .................. 10-2010-0129322

(51) Int. Cl.
*G06K 9/00* (2006.01)
*G06T 17/05* (2011.01)
*G06T 7/00* (2006.01)

(52) U.S. Cl.
CPC .......... *G06K 9/00637* (2013.01); *G06T 7/0024* (2013.01); *G06T 17/05* (2013.01)

(58) Field of Classification Search
None
See application file for complete search history.

(56) References Cited

U.S. PATENT DOCUMENTS

| 6,711,293 B1* | 3/2004 | Lowe ............................ 382/219 |
| 2009/0067725 A1* | 3/2009 | Sasakawa et al. ............. 382/190 |
| 2011/0064312 A1* | 3/2011 | Janky et al. ................... 382/195 |
| 2011/0292208 A1* | 12/2011 | Zhou et al. .................... 348/144 |

FOREIGN PATENT DOCUMENTS

KR    2000-0064227    11/2000

OTHER PUBLICATIONS

Tat-Jen Cham et al., "Estimating Camera Pose from a Single Urban Ground-View Omnidirectional Image and a 2D Building Outline Map", 2010 IEEE.

* cited by examiner

*Primary Examiner* — Kim Vu
*Assistant Examiner* — Fred Hu
(74) *Attorney, Agent, or Firm* — Staas & Halsey LLP

(57) ABSTRACT

Disclosed herein is an apparatus and method for extracting correspondences between aerial images. The apparatus includes a line extraction unit, a line direction determination unit, a building top area extraction unit, and a correspondence extraction unit. The line extraction unit extracts lines corresponding buildings from aerial images. The line direction determination unit defines the directions of the lines as x, y and z axis directions based on a two-dimensional (2D) coordinate system. The building top area extraction unit rotates lines in the x and y axis directions so that the lines are arranged in parallel with the horizontal and vertical directions of the 2D image, and then extracts building top areas from rectangles. The correspondence extraction unit extracts correspondences between the aerial images by comparing the locations of the building top areas extracted from the aerial images.

12 Claims, 8 Drawing Sheets

———: LINES IN VERTICAL DIRECTION
------: LINES IN HORIZONTAL DIRECTIONS

APPARATUS AND METHOD FOR EXTRACTING CORRESPONDENCES BETWEEN AERIAL IMAGES

CROSS REFERENCE TO RELATED APPLICATION

This application claims the benefit of Korean Patent Application No. 10-2010-0129322, filed on Dec. 16, 2010, which is hereby incorporated by reference in its entirety into this application.

BACKGROUND OF THE MENTION

1. Technical Field

The present invention relates generally to an apparatus and method for extracting correspondences between aerial images and, more particularly, to an apparatus and method for extracting correspondences between aerial images, which are capable of automatically calculating correspondences between aerial images using the linear characteristics of buildings based on aerial images of urban areas in which buildings occupy the majority of the photos.

2. Description of the Related Art

In order to determine correspondences between images, a method in which a human directly intervenes and manually marks corresponding points and a method of automatically calculating corresponding points have been used.

The method of automatically calculating corresponding points has developed from a method of comparing pixels between images to a method of finding identical portions by calculating the feature descriptors of the respective portions of an image and comparing the feature descriptors with feature descriptors extracted from another image.

A variety of methods using feature descriptors have been devised that range from a simple method using the pixel values of images to a method of calculating the directions of the gradients of images. Recent methods can find corresponding points at high accuracy even when image capture conditions are considerably poor.

Although the methods of comparing feature descriptors exhibit excellent performance for general photos, many identical feature descriptors are calculated due to the similarity between buildings and the similarity between parts of buildings when the methods are applied to images of urban areas including many buildings, and therefore the calculation of corresponding points using feature descriptors exhibits low efficiency.

SUMMARY OF THE INVENTION

Accordingly, the present invention has been made keeping in mind the above problems occurring in the prior art, and an object of the present invention is to provide an apparatus and method for finding correspondences between aerial images, which are capable of extracting correspondences between aerial images of urban areas, in which it is difficult to automatically find corresponding points using only feature descriptors and the majority of each image is occupied by buildings.

Another object of the present invention is to provide an apparatus and method for extracting correspondences between aerial images, which do not use local features that generate ambiguity in cases such as buildings, but determine the relations between multiple buildings and automatically calculate correspondences that cannot be calculated using local features.

In order to accomplish the above object, the present invention provides an apparatus for extracting correspondences between aerial images, including a line extraction unit for extracting lines corresponding buildings from two or more aerial images; a line direction determination unit for defining directions of the lines as x, y and z axis directions based on a coordinate system of a two-dimensional (2D) image; a building top area extraction unit for rotating lines in the x axis direction and lines in the y axis direction so that the lines in the x axis direction are arranged in parallel with a horizontal direction of the 2D image and the lines in the y axis direction are arranged in parallel with a vertical direction of the 2D image, and then extracting building top areas from rectangles that are formed by the rotation; and a correspondence extraction unit for extracting correspondences between the aerial images by comparing locations of the building top areas extracted from the aerial images.

The line extraction unit may extract lines corresponding to edges and contours of the buildings from among lines that are selected from among the lines of the aerial images and fall within a preset reference range.

The line direction determination unit may create a direction distribution histogram of the lines, and define directions having three highest peak values in the direction distribution histogram as x, y, and z axis directions, respectively.

The line direction determination unit may define one of the highest peak value directions closest to a vertical direction as the z axis direction and two remaining highest peak value directions as the x and y axis directions, respectively.

The line direction determination unit may define an arbitrary one of the two remaining highest peak value directions as the x axis direction and a remaining highest peak value direction as the y axis direction.

When each of the building top areas is not a rectangle, the building top area extraction unit may create a rectangle by extending the lines in the x and y axis directions.

The correspondence extraction unit may define central points of the building top areas as feature points and extract correspondences between the aerial images based on locations of the feature points and the edges of the building top areas.

The apparatus may further include a transformation matrix calculation unit for calculating a transformation matrix according to rotation and translation transformation of the buildings between the aerial images, from sums of squares of distances between coordinates of the feature points of the aerial images.

The correspondence extraction unit may extract corresponding points of another aerial image for the feature points using the transformation matrix, and compare locations of the feature points with locations of the corresponding points of the latter aerial image.

Additionally, in order to accomplish the above object, the present invention provides a method of extracting correspondences between aerial images, including extracting lines corresponding buildings from two or more aerial images; defining directions of the lines as x, y and z axis directions based on a coordinate system of a 2D image; rotating lines in the x axis direction and lines in the y axis direction so that the lines in the x axis direction are arranged in parallel with a horizontal direction of the 2D image and the lines in the y axis direction are arranged in parallel with a vertical direction of the 2D image, and then extracting building top areas from rectangles that are formed by the rotation; and extracting correspondences between the aerial images by comparing locations of the building top areas extracted from the aerial images.

The extracting lines may extract lines corresponding to edges and contours of the buildings from among lines that are selected from among the lines of the aerial images and fall within a preset reference range.

The defining may include creating a direction distribution histogram of the lines, and define directions having three highest peak values in the direction distribution histogram as x, y, and z axis directions, respectively.

The defining may define one of the highest peak value directions closest to a vertical direction as the z axis direction and two remaining highest peak value directions as the x and y axis directions, respectively.

The defining may define an arbitrary one of the two remaining highest peak value directions as the x axis direction and a remaining highest peak value direction as the y axis direction.

When each of the building top areas is not a rectangle, the extracting building top areas may include creating a rectangle by extending the lines in the x and y axis directions.

The extracting correspondences may include defining central points of the building top areas as feature points, and extract correspondences between the aerial images based on locations of the feature points and the edges of the building top areas.

The method may further include calculating a transformation matrix according to rotation and translation transformation of the buildings between the aerial images, from sums of squares of distances between coordinates of the feature points of the aerial images.

The extracting correspondences may further include extracting corresponding points of another aerial image for the feature points using the transformation matrix; and comparing locations of the feature points with locations of the corresponding points of the latter aerial image.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
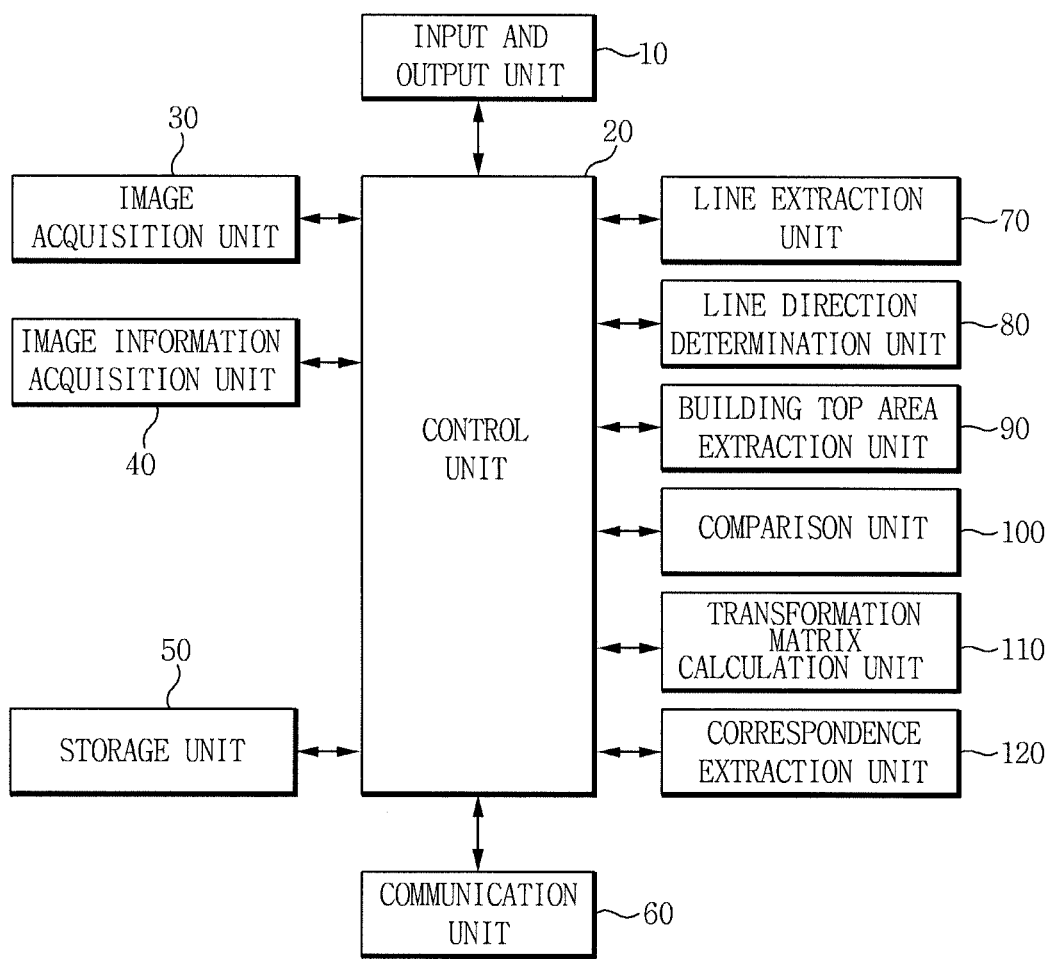
FIG. 1 is a block diagram that is used to describe the configuration of an apparatus for extracting correspondences between aerial images according to the present invention.

Reference now should be made to the drawings, throughout which the same reference numerals are used to designate the same or similar components.

Embodiments of the present invention will be described below with reference to the accompanying drawings.

FIG. 1 is a block diagram showing an apparatus for extracting correspondences between aerial images according to the present invention.

As shown in FIG. 1, an apparatus for extracting correspondences between aerial images (hereinafter referred to as the "correspondence extraction apparatus") according to the present invention includes an input and output unit 10, a control unit 20, an image acquisition unit 30, an image information acquisition unit 40, a storage unit 50, a communication unit 60, a line extraction unit 70, a line direction determination unit 80, a building top area extraction unit 90, a comparison unit 100, a transformation matrix calculation unit 110, and a correspondence extraction unit 120. Here, the control unit 20 controls the operation of the respective units of the apparatus for extracting correspondences between aerial images.

The input and output unit 10 receives control commands from a user, and outputs the operating status of the apparatus for extracting correspondences between aerial images and results.

The image acquisition unit 30 acquires two or more aerial images that have been captured from an airplane.

The image information acquisition unit 40 acquires information about aerial images acquired by the image acquisition unit 30. As an example, the image information acquisition unit 40 acquires camera location information (GPS coordinates or the like), directional information (the 3D vector of a direction of capture or the like), and posture information at the time when corresponding aerial images were captured.

The line extraction unit 70 extracts lines formed along the edges and contours of buildings from the aerial images. In this case, the line extraction unit 70 extracts lines from aerial images using an image processing algorithm. Line extraction is performed using only 2D image information, and is performed by forming long lines by first extracting short lines and then connecting neighboring lines.

After the lines have been extracted, lines stemming from objects other than buildings are removed from the extracted lines. In this case, the line extraction unit 70 leaves only lines whose lengths fall within a preset reference range, and removes lines corresponding to the upper p % and the lower q %. Here, the values of p and q are experimentally determined so that they allow the lines of buildings to be extracted best.

The line direction determination unit 80 determines the directions of the lines extracted by the line extraction unit 70. In this case, the line direction determination unit 80 creates a line direction distribution histogram. Here, the directions of lines are defined based on a 2D image coordinate system. Here, the direction components of lines are defined using values between 0 and $\pi$.

The line direction determination unit 80 calculates directions having peak values in a direction histogram. In this case, the three highest peak values are selected from among calculated peak values and are compared with the fourth highest peak value. If the ratio of the difference is not higher than a predetermined ratio, the image is divided into smaller images. If the ratio of the difference is higher than the predetermined ratio, the three peak values are defined as the x, y, and z axis directions.

The line direction determination unit 80 selects a vertical direction from among three axial directions. The selection of the vertical direction is performed using information about the posture of a camera. Using the information about the posture of a camera, a 3D vertical direction is transformed into the vertical direction of an image captured by a camera, and then the resulting direction is compared with three axial directions. Among these three axial directions, the direction closest to the vertical direction calculated using the information about the posture of the camera is recorded as the vertical direction.

The building top area extraction unit 90 transforms the image so that the remaining two directions are consistent with the x and y axis directions (the horizontal and vertical directions) of the image. In this case, the building top area extraction unit 90 arbitrarily selects one of the remaining two directions, and performs rotation transformation so that the arbitrarily selected direction becomes the horizontal direction. Accordingly, the arbitrarily selected direction becomes parallel to the axis direction.

Furthermore, the building top area extraction unit 90 selects another direction from between the two directions, and performs rotation transformation so that the selected direction becomes the vertical direction. Accordingly, the selected direction is parallel to the y axis direction.

Accordingly, the building top area extraction unit 90 extracts the top area of a building from a rectangle that is formed by lines that have been rotated in parallel to the x and y axis directions.

If the top area of a corresponding building is not a rectangle because the building is partially hidden by another building, the building top area extraction unit 90 may arbitrarily form a rectangle by extending lines in two directions. In this case, a parallelogram that is formed by the side of the rectangle is a side of the building. The building top area extraction unit 90 stores the top areas and contours of buildings in the storage unit 50.

The comparison unit 100 compares the relative locations of the top areas of the buildings extracted from aerial images. In this case, the comparison unit 100 determines the locations of the top areas of the buildings using the image information acquired by the image information acquisition unit 40.

The correspondence extraction unit 120 extracts correspondences between the images based on the results of the comparison by the comparison unit 100.

The correspondence extraction unit 120 causes the feature points of one image to correspond to another image using the correspondences between the images. In this case, the correspondence extraction unit 120 compares the feature points of one image with the corresponding feature points of another image, and stores correspondence information if the former feature points are consistent with the latter feature points.

In this case, the correspondence extraction unit 120 determines the scale of a corresponding image using image information, for example, a capture direction, a capture distance or the like. Meanwhile, when the correspondence extraction unit 120 does not have image information, the correspondence extraction unit 120 may compensate for the difference in scale between images by normalizing a corresponding image using the average value of the top areas of buildings.

Meanwhile, the transformation matrix calculation unit 110 calculates a transformation matrix based on information about the correspondences between images. In this case, the transformation matrix calculation unit 110 calculates rotation translation (0 degrees, 90 degrees, 180 degrees, and 270 degrees) and translation transformation between the images that make the sums of the squares of the distances between the coordinates of the central points of the top areas of the buildings minimum. Accordingly, the transformation matrix calculation unit 110 acquires a transformation matrix based on the rotation and translation transformation between the images.

Accordingly, the correspondence extraction unit 120 can determine the locations of the points corresponding to feature points of one image in another image using the transformation matrix acquired by the transformation matrix calculation unit 110. In this case, if the feature points of one image are not consistent with the feature points of another image that are made to correspond to the former features points based on the transformation matrix, the correspondence extraction unit 120 extracts correspondences again or corrects information about the extracted correspondences.

Figure 2:
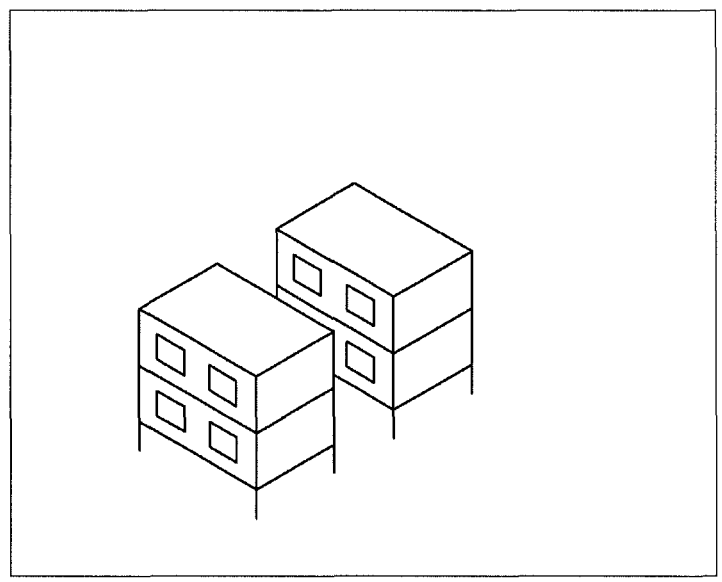
FIG. 2 is a diagram that is used to describe the line extraction operation of the apparatus for extracting correspondences between aerial images according to the present invention.

FIG. 2 illustrates the line extraction operation of the apparatus for extracting correspondences between aerial images according to the present invention, and is particularly referred to in connection with a description of the operation of the line extraction unit.

As shown in FIG. 2, the line extraction unit analyzes an aerial image and extracts lines from the aerial image. In this case, the line extraction unit removes lines generated in a portion other than a building, and extracts only lines formed along the edges and contours of a building.

As an example, the line extraction unit compares the lengths of lines extracted from the aerial image, and leaves lines within a predetermined reference range and removes lines above the reference range or below the reference range. In this case, the reference range is experimentally determined based on the lengths of lines extracted from buildings.

Figure 3:
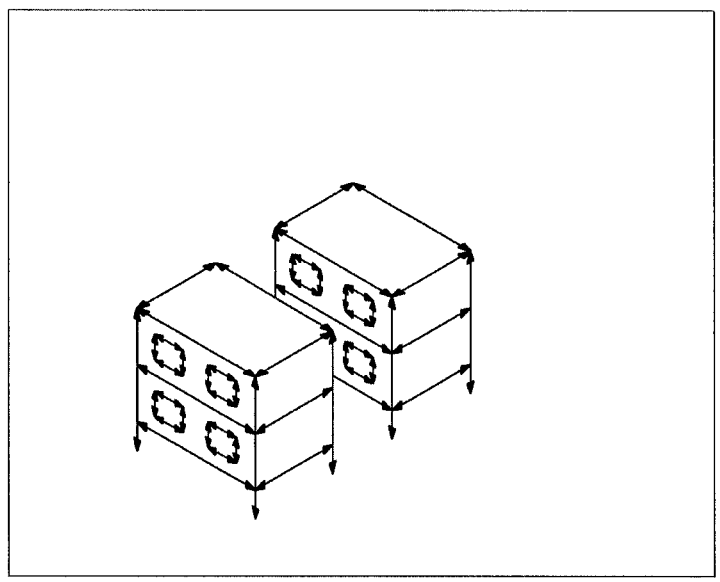
FIG. 3 is a diagram that is used to describe the line direction determination operation of the apparatus for extracting correspondences between aerial images according to the present invention.
Figure 4:
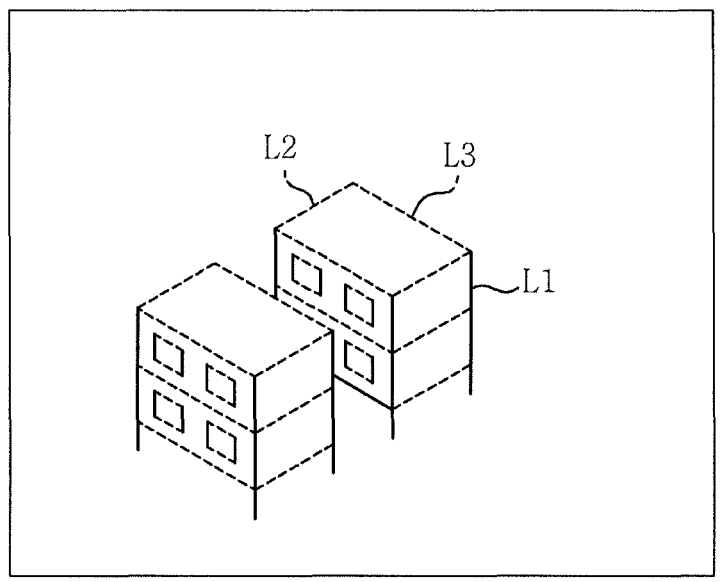
FIG. 4 is a diagram that is used to describe the vertical direction determination operation of the apparatus for extracting correspondences between aerial images according to the present invention.

FIGS. 3 and 4 are diagrams that are referred to in connection with the operation of the line direction determination unit.

FIG. 3 illustrates the line direction determination operation of the apparatus for extracting correspondences between aerial images according to the present invention, and FIG. 4 illustrates the vertical direction determination operation of the apparatus for extracting correspondences between aerial images according to the present invention.

As shown in FIG. 3, the line direction determination unit determines the directions of the lines extracted as shown in FIG. 2. In this case, the line direction determination unit defines the directions of the extracted lines on the basis of a 2D image coordinate system. Here, the direction components of the extracted lines are defined using values between 0 and $\pi$.

Meanwhile, the line direction determination unit generates the direction distribution histogram of the extracted lines. In this case, the line direction determination unit calculates direction components having peak values based on the direction histogram and defines the three highest values of the calculated peak values as the three axial (x, y and z axis) directions.

In this case, the line direction determination unit selects the direction of lines L1 (the vertical direction) as the z axis direction, that is, the direction of the side edges of a building, as shown in FIG. 4. Here, when there are no lines in the vertical direction, the line direction determination unit selects the direction of lines closest to the vertical direction as the z axis direction.

Meanwhile, the line direction determination unit defines one of two horizontal directions of lines L2 and L3 as the x axis direction and the other as the y axis direction.

Figure 5:
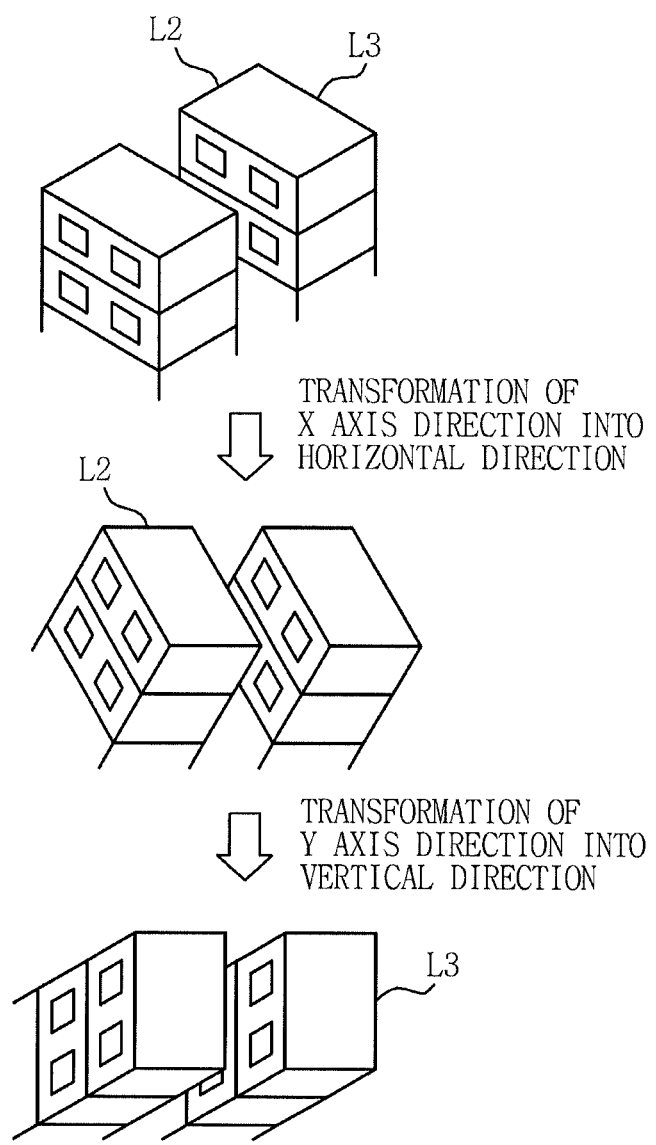
FIG. 5 is a diagram that is used to describe the image transformation operation of the apparatus for extracting correspondences between aerial images according to the present invention.
Figure 6:
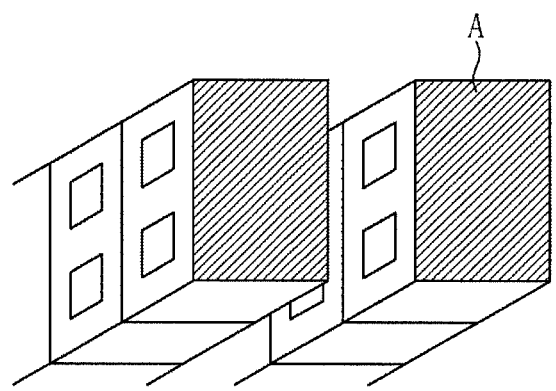
FIG. 6 is a diagram that is used to describe the building top area extraction operation of the apparatus for extracting correspondences between aerial images according to the present invention.

FIGS. 5 and 6 are diagrams that are used to describe the operation of the building top area extraction unit.

FIG. 5 illustrates the image transformation operation of the building top area extraction unit.

As shown in FIG. 5, the building top area extraction unit transforms an image so that the lines L2 and L3 in the x and y axis directions are arranged in parallel to the horizontal and vertical directions of an image.

In other words, the building top area extraction unit selects one (the x axis direction) of the two horizontal directions, and performs rotation transformation so that lines L2 in the corresponding horizontal direction are arranged in parallel to the horizontal axis direction of the image. Furthermore, the building top area extraction unit selects the remaining horizontal direction (the y axis direction), and performs rotation transformation so that lines L3 in the corresponding horizontal direction are arranged in parallel to the vertical direction of the image.

The image finally obtained by the building top area extraction unit is shown in FIG. 6.

Accordingly, the building top area extraction unit extracts the top area A of a building from the rectangle formed by the lines and rotated in parallel to the x and y axis directions of the image, as shown in FIG. 6. If the top area of a corresponding building is not a rectangle because the building is partially hidden by another building, the building top area extraction unit may arbitrarily form a rectangle by extending lines in two directions.

Figure 7:
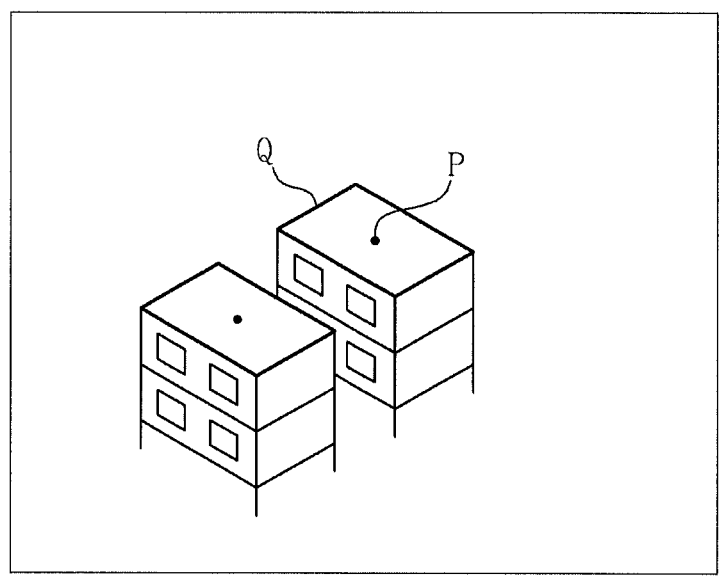
FIGS. 7 and 8 are diagrams that are used to describe the inter-building top area correspondence extraction operation of the apparatus for extracting correspondences between aerial images according to the present invention.
Figure 8:
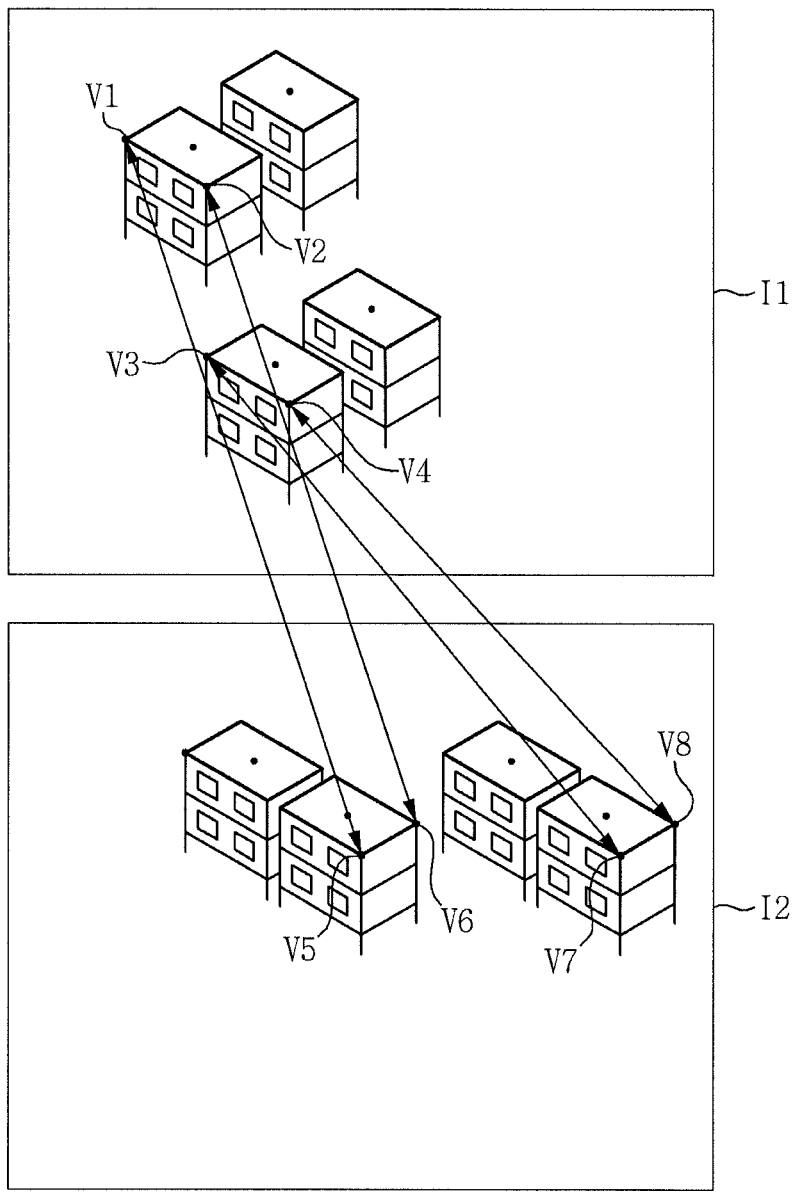

FIGS. 7 and 8 are diagrams that are used to describe the inter-building top area correspondence extraction operation of the apparatus for extracting correspondences between aerial images according to the present invention.

FIG. 7 illustrates the operation of extracting a feature point of a building top area extracted from an aerial image. As shown in FIG. 7, the correspondence extraction unit defines the central point of a building top area as a feature point P, and extracts correspondences between aerial images based on the feature point P and edge Q of the building top area.

Furthermore, the correspondence extraction unit determines the scale of the corresponding image based on image information, for example, a capture direction and a capture distance. Thereafter, the correspondence extraction unit matches the extracted feature point P and the edge Q to those of another image, and compares the feature point P with the corresponding point of the latter image.

In this case, the transformation matrix calculation unit calculates rotation (0 degrees, 90 degrees, 180 degrees, and 270 degrees) and translation transformations between the images, which make the sums of the squares of the distances between the coordinates of the feature points P of the building top areas minimum. Accordingly, the correspondence extraction unit may check another image for the locations of corresponding points for the feature points of an image using the transformation matrix obtained by the transformation matrix calculation unit 110. Here, when searching for corresponding points, the correspondence extraction unit may perform comparison using existing feature descriptors or check them using cross correlation between aerial images.

The locations of the corresponding points of aerial image 2 I2 for the feature points of aerial image1 I1 are shown in FIG. 8. In other words, it can be seen that apexes V1, V2, V3 and V4 formed by the edges of building top areas in aerial image1 I1 correspond to apexes V5, V6, V7 and V8 in aerial image2 I2.

In this case, when the feature points of one image are not consistent with the feature points of another image that are made to correspond to the former feature points using the transformation matrix, the correspondence extraction unit may extract correspondences again or correct extracted correspondence information.

Figure 9:
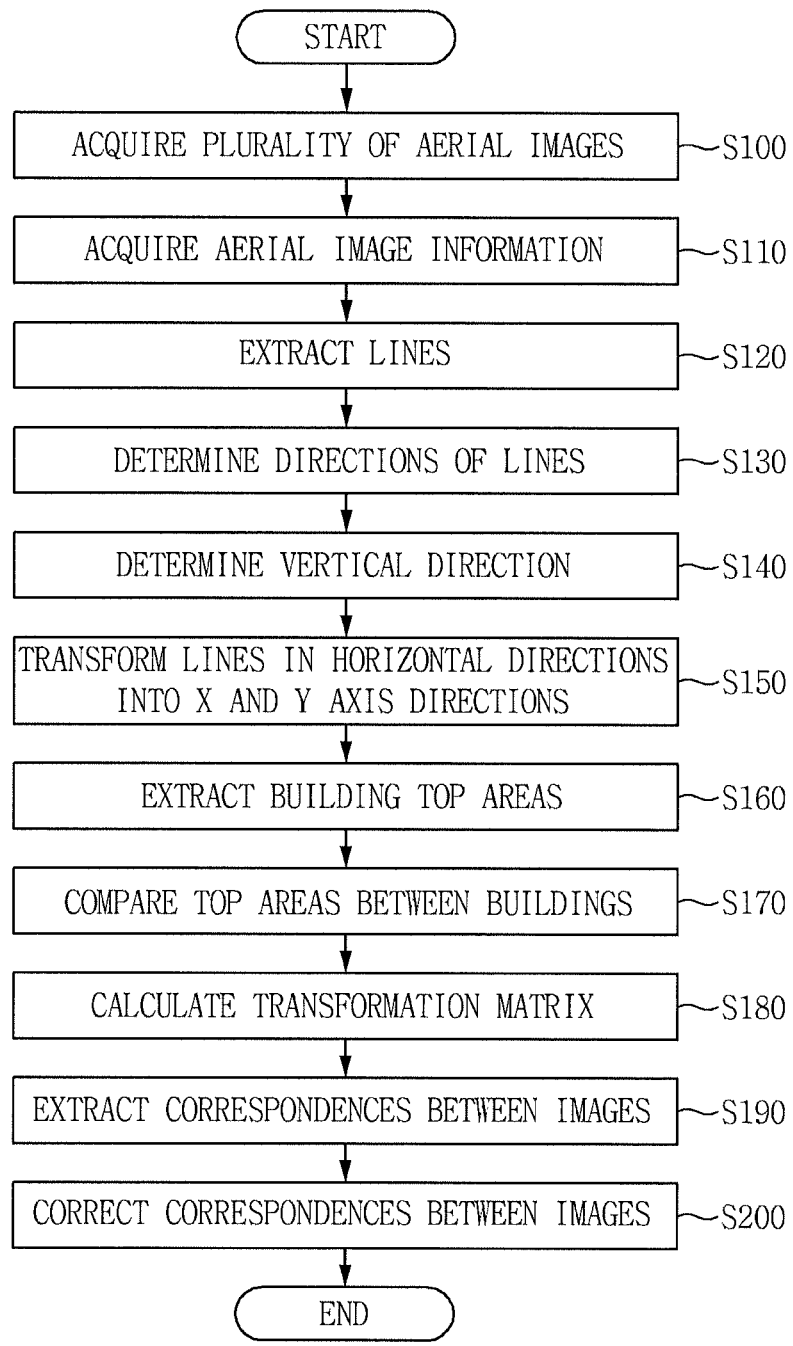
FIG. 9 is a flowchart illustrating the operational flow of a method of extracting correspondences between aerial images according to the present invention.

FIG. 9 is a flowchart illustrating the operational flow of a method of extracting correspondences between aerial images according to the present invention.

As shown in FIG. 9, the correspondence extraction apparatus according to the present invention acquires a plurality of aerial images at step S100, and also acquires image information about each of the aerial images at step S110.

Thereafter, the correspondence extraction apparatus extracts lines corresponding to buildings from the acquired aerial images at step S120, and determines the directions of the extracted lines at step S130. In this case, the correspondence extraction apparatus determines the directions of the extracted lines on the basis of a 2D image coordinate system.

Furthermore, the correspondence extraction apparatus selects three directions having the three highest peak values in the direction histogram from among the directions of the lines extracted at step S120. The correspondence extraction apparatus determines one of the three directions to be a vertical direction at step S140. In this case, the correspondence extraction apparatus defines the vertical direction as the z axis direction.

Meanwhile, the correspondence extraction apparatus defines one of the two horizontal directions of the three directions as the x axis direction and the other horizontal direction as the y axis direction, and transforms the lines in the horizontal directions so that they are parallel to the x and y axis directions at step S150. In this case, the correspondence extraction apparatus extracts rectangles, formed by the lines in the x and y axis directions, as building top areas at step S160.

Thereafter, the correspondence extraction apparatus compares the building top areas, extracted from the aerial images, with each other at step S170, and calculates a transformation matrix between the aerial images at step S180. In this case, the correspondence extraction apparatus extracts correspondences between the aerial images using the calculated transformation matrix at step S190. If the correspondences extracted at step S180 are not consistent, the correspondence extraction apparatus corrects the correspondence information at step S200.

The present invention has the advantage of automatically calculating correspondences between aerial images of urban areas, which cannot be easily achieved using the conventional feature descriptor comparison method.

Furthermore, the present invention has the advantage of being able to extract correspondences between images of areas having no local features because the present invention uses macroscopic relations, rather than the local features of buildings, for the aerial images of urban areas.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for extracting correspondences between aerial images, comprising:
one or more processors configured to:
extract lines corresponding buildings from two or more aerial images;

define directions of the lines as x, y and z axis directions based on a coordinate system of a two-dimensional (2D) image;
rotate lines in the x axis direction and lines in the y axis direction so that the lines in the x axis direction are arranged in parallel with a horizontal direction of the 2D image and the lines in the y axis direction are arranged in parallel with a vertical direction of the 2D image, and then extract building top areas from rectangles that are formed by the rotation;
extract correspondences between the aerial images by comparing locations of the building top areas extracted from the aerial images;
create a direction distribution histogram of the lines, and define directions having three highest peak values in the direction distribution histogram as x, y, and z axis directions, respectively;
define one of the highest peak value directions closest to a vertical direction as the z axis direction and two remaining highest peak value directions as the x and y axis directions, respectively; and
define an arbitrary one of the two remaining highest peak value directions as the x axis direction and a remaining highest peak value direction as the y axis direction.

2. The apparatus as set forth in claim 1, wherein the lone or more processors are further configured to extract lines corresponding to edges and contours of the buildings from among lines that are selected from among the lines of the aerial images and fall within a preset reference range.

3. The apparatus as set forth in claim 1, wherein the one or more processors are further configured to, when each of the building top areas is not a rectangle, create a rectangle by extending the lines in the x and y axis directions.

4. The apparatus as set forth in claim 1, wherein the one or more processors are further configured to define central points of the building top areas as feature points and extracts correspondences between the aerial images based on locations of the feature points and the edges of the building top areas.

5. The apparatus as set forth in claim 4, one or more processors are further configured to calculate a transformation matrix according to rotation and translation transformation of the buildings between the aerial images, from sums of squares of distances between coordinates of the feature points of the aerial images.

6. The apparatus as set forth in claim 5, wherein the one or more processors are further configured to extract corresponding points of another aerial image for the feature points using the transformation matrix, and compare locations of the feature points with locations of the corresponding points of the latter aerial image.

7. A non-transitory computer readable medium encoded with a computer program for extracting correspondences between aerial images, the program when executed by a computer causes the computer to perform a method comprising:
extracting lines corresponding buildings from two or more aerial images;
defining directions of the lines as x, y and z axis directions based on a coordinate system of a 2D image;
rotating lines in the x axis direction and lines in the y axis direction so that the lines in the x axis direction are arranged in parallel with a horizontal direction of the 2D image and the lines in the y axis direction are arranged in parallel with a vertical direction of the 2D image, and then extracting building top areas from rectangles that are formed by the rotation;
extracting correspondences between the aerial images by comparing locations of the building top areas extracted from the aerial images;
creating a direction distribution histogram of the lines, and defines directions having three highest peak values in the direction distribution histogram as x, y, and z axis directions, respectively;
defining one of the highest peak value directions closest to a vertical direction as the z axis direction and two remaining highest peak value directions as the x and y axis directions, respectively; and
defining an arbitrary one of the two remaining highest peak value directions as the x axis direction and a remaining highest peak value direction as the y axis direction.

8. The non-transitory computer readable medium as set forth in claim 7, wherein the extracting lines extracts lines corresponding to edges and contours of the buildings from among lines that are selected from among the lines of the aerial images and fall within a preset reference range.

9. The non-transitory computer readable medium as set forth in claim 7, wherein the extracting building top areas comprises, when each of the building top areas is not a rectangle, creating a rectangle by extending the lines in the x and y axis directions.

10. The non-transitory computer readable medium as set forth in claim 7, wherein the extracting correspondences comprises defining central points of the building top areas as feature points, and extracts correspondences between the aerial images based on locations of the feature points and the edges of the building top areas.

11. The non-transitory computer readable medium as set forth in claim 10, further comprising calculating a transformation matrix according to rotation and translation transformation of the buildings between the aerial images, from sums of squares of distances between coordinates of the feature points of the aerial images.

12. The non-transitory computer readable medium as set forth in claim 11, wherein the extracting correspondences further comprises:
extracting corresponding points of another aerial image for the feature points using the transformation matrix; and
comparing locations of the feature points with locations of the corresponding points of the latter aerial image.

* * * * *